(12) United States Patent
Zhang et al.

(10) Patent No.: US 10,875,811 B2
(45) Date of Patent: Dec. 29, 2020

(54) CONCRETE CONSTRUCTION METHOD FOR CONTROLLING SETTING TIME AND SPECIAL EQUIPMENT THEREOF

(71) Applicant: Pengcheng Zhang, Chongqing (CN)

(72) Inventors: Pengcheng Zhang, Chongqing (CN); Ke Chen, Chongqing (CN); Yongwei Wang, Chongqing (CN); Yawen Liu, Chongqing (CN)

(73) Assignee: Pengcheng Zhang, Chongqing (CN)

( * ) Notice: Subject to any disclaimer, the term of this patent is extended or adjusted under 35 U.S.C. 154(b) by 0 days.

(21) Appl. No.: 15/785,495

(22) Filed: Oct. 17, 2017

(65) Prior Publication Data

US 2018/0037507 A1 Feb. 8, 2018

Related U.S. Application Data

(63) Continuation of application No. PCT/CN2016/000200, filed on Apr. 14, 2016.

(30) Foreign Application Priority Data

Apr. 17, 2015 (CN) .......................... 2015 1 0183147

(51) Int. Cl.
*E04G 21/04* (2006.01)
*C04B 28/08* (2006.01)
(Continued)

(52) U.S. Cl.
CPC .............. *C04B 28/08* (2013.01); *B28B 1/001* (2013.01); *B33Y 10/00* (2014.12); *C04B 22/062* (2013.01);
(Continued)

(58) Field of Classification Search
CPC ...................................................... B28B 7/42
See application file for complete search history.

(56) References Cited

U.S. PATENT DOCUMENTS

| 3,335,460 | A | * | 8/1967 | Zbynek | ..................... | B28B 3/20 |
| | | | | | | 425/174.6 |
| 3,780,200 | A | * | 12/1973 | Maurer | ..................... | H05B 3/03 |
| | | | | | | 373/125 |
| 2013/0295338 | A1 | | 11/2013 | Keating et al. | | |

FOREIGN PATENT DOCUMENTS

| CN | 1151979 A | 6/1997 |
| CN | 200953020 Y | 9/2007 |

(Continued)

*Primary Examiner* — Monica A Huson
*Assistant Examiner* — Kelsey C Grace
(74) *Attorney, Agent, or Firm* — Wayne & Ken, LLC; Tony Hom

(57) ABSTRACT

The present invention discloses a concrete construction method for controlling setting time and special equipment thereof. The technical solution comprises processes of mixing, pumping, extruding, forming, setting and hardening. An electric treatment of applying an external electric field to a concrete mixture is provided between the pumping and the extruding process. The mixture treated by the external electric field is immediately extruded through an extrusion outlet. The special equipment comprises a transporting pump, a transporting pipeline and an extrusion device. The extrusion device comprises an equipment for electrical process and the extrusion outlet. By adopting the construction solution and equipment in the present technical solution, an effect on rapid controlling or adjusting the concrete setting time is achieved and an early strength of concrete is rapidly and rationally enhanced. A requirement of adjusting concrete setting time at will before the forming process is met.

1 Claim, 5 Drawing Sheets

(51) Int. Cl.
    *C04B 28/00*     (2006.01)
    *E04G 21/02*     (2006.01)
    *C04B 40/00*     (2006.01)
    *B33Y 10/00*     (2015.01)
    *B28B 1/00*     (2006.01)
    *C04B 22/06*     (2006.01)
    *C04B 28/06*     (2006.01)
    *C04B 111/00*     (2006.01)
    *C04B 103/12*     (2006.01)

(52) U.S. Cl.
    CPC .............. *C04B 28/00* (2013.01); *C04B 28/06* (2013.01); *C04B 40/0007* (2013.01); *C04B 40/0032* (2013.01); *E04G 21/02* (2013.01); *E04G 21/04* (2013.01); *E04G 21/0418* (2013.01); *C04B 2103/12* (2013.01); *C04B 2111/00181* (2013.01)

(56) References Cited

FOREIGN PATENT DOCUMENTS

| | | | |
|---|---|---|---|
| CN | 101280628 A | 10/2008 | |
| CN | 103331817 A | 10/2013 | |
| CN | 103707387 A | 4/2014 | |
| CN | 103790378 A | 5/2014 | |
| CN | 103967276 A | 8/2014 | |
| CN | 104023925 A | 9/2014 | |
| CN | 104878935 A | 9/2015 | |
| CN | 105731947 A | 7/2016 | |
| JP | H07229298 A | 8/1995 | |
| JP | 2003206508 A | 7/2003 | |

\* cited by examiner

CONCRETE CONSTRUCTION METHOD FOR CONTROLLING SETTING TIME AND SPECIAL EQUIPMENT THEREOF

TECHNICAL FIELD

The present invention relates to a concrete construction method for controlling setting time and a special equipment thereof, specially to a concrete construction method for 3D print concrete forming and normal concrete forming and a special equipment thereof.

BACKGROUND

Human life and development history is a history of a development of various materials. Building materials develop with the development of mankind and are constantly updated. The concrete material has excellent plasticity before setting, excellent mechanical properties after hardening and excellent durability. Therefore, the concrete material is currently the most widely used building materials, but also a preferable basic material for a variety of construction infrastructures. Concrete can be classified according to the different types of cementing materials, such as silicate cement concrete, alkali slag concrete, sulphoaluminate concrete, phosphate concrete. An approximately same technical performance is provided by these concrete materials.

3D print buildings provide new ways for future buildings. 3D print buildings form the required building structure by stacking concrete in layers. The properties of concrete inks, especially the setting time and mechanical properties of concrete inks determine the construction quality and progress of 3D buildings. Concrete ink is the core technology of existing 3D building printing, however a formula and construction methods thereof are rarely open. To ensure the setting time of the concrete 3D print building structure, it is usually necessary to set a fixed setting time and to add a cementing material in a fixed proportion according to the construction speed. Once the fixed proportion of the cementing material is added and mixed with concrete, the setting time can not be easily changed. A patent document "A 3D print method for a building beam component" (application no. 201310697608.X) discloses a method for increasing a temperature of concrete to reducing setting time by using a hot steam. Although time can be reduced by this method, the effect of change is slow and a range of adjustable setting time is narrow. Moreover, the environmental temperature impact on this method is significant, and technical problems can not be fully achieve for controlling setting time.

The existing methods of adjusting the concrete setting time is to add a variety of an early strength agent, a quick-setting agent or a retarder and any other additives with a certain amount into concrete, adjusting the setting and hardening time by changing a composition and a dosage of the additives. When a mixing ratio of concrete is once determined, the setting and hardening time will be basically determined. Excellent fluidity as well as long setting time can not be achieved by the prepared concrete, thus failing to meet requirements of mixing and transportation and failing to obtain long setting time. In addition, a patent application from the applicant, entitled "alkali-activated cementing materials for controlling setting time, control methods and applications thereof" (application no. 2015100322160) discloses a technology for controlling setting time of casting-formed concrete prepared with alkali-activated cementing materials. Since the adjusting or controlling of setting time according to the requirement is achieved after forming in the previously mentioned technology, it is especially not suitable for 3D print concrete technology which requires for controlling the setting time during the forming process.

SUMMARY

The technical solution to solve existing technical problems provides a new construction method and a special equipment, aiming at the deficiency that the setting time of concrete is uncontrollable after the confirmation of the materials by using the technical solution of setting an early strength agent, a quick-setting agent or a retarder and other additives in advance to adjust the setting time through changing the composition and dosages of the additives. The technical solution also aims at the disadvantage of capability of controlling the setting time only after the forming process. Controlling the setting time during the construction process can be achieved according to the requirement, which meets the requirement to adjust and control the setting time before forming, and the prepared concrete has an excellent fluidity and a long setting time before the forming process, thus meeting the requirement of mixing and transportation; and an early strength of concrete as well as the construction efficiency are rapidly and rationally enhanced.

The first objective of the present invention is to provide a construction method for controlling the setting time of alkali-activated cementing materials. The second objective of the present invention is to provide a special equipment for the construction method mentioned above.

To fulfill the first objective of the present invention, the concrete construction method for controlling setting time comprises the following processes:

a. mixing: evenly mixing a concrete raw material with mixing water and aggregate to form a concrete mixture; the concrete raw material at least comprises an activator and a cementing material comprising a powdery active material containing silicon-aluminum oxides;

b. pumping: pumping the concrete mixture to an extrusion device through a transporting pipeline;

c. extruding: extruding the concrete mixture through an extrusion outlet;

d. forming: forming a construction component with a required size and shape; and e. setting and hardening: setting and hardening the construction component;

Between the step b and the step c, an electric treatment step of applying an external electric field to the concrete mixture is further included; the concrete mixture applied with the external electric field is immediately extruded through the extrusion outlet; and the external electric field provides an alternative current.

Since an electric treatment process is added to apply an external electric field to the concrete mixture in the construction method, the electric treatment process enables to accelerate a hydration rate of cementing materials in the concrete mixture, and control the setting time. Therefore, adjusting and controlling the setting time is possible to be achieved in any processes before the forming process. Applying an external electric field in the electric treatment process is able to be powered on or powered off at any moment and the voltage applied is adjustable according to the requirement. So that the early strength of concrete as well as the construction efficiency are rapidly and rationally enhanced. At the same time, as the previous concrete mixture with cementing materials has an excellent fluidity and a long setting time to meet the mixing and transportation requirements, the concrete in the present technical solution has the same properties as the normal concrete materials under the uncharged condition. The concrete also has an excellent fluidity and a long setting time to meet the mixing and transportation requirements. Compared with the technical solution of adjusting and changing the setting and hardening time by providing an early strength agent, a quick-setting agent or a retarder and other additives set in advance, this method is more suitable for the requirement of mixing and transportation. The mixture applied with the external electric field is immediately extruded through an extrusion outlet. In addition, the external voltage is adjustable according to the time of the forming process and extrusion rate. Different voltage is able to control the setting time of the concrete. Compared with the water vapor in the prior art, the regulation of voltage is more convenient to operate and has a wider adjustable range. Moreover, adjusting and controlling the setting time at any moment before the concrete forming can be provided according to the requirement of forming time, which is a dynamic and adjustable technology before concrete forming. This technology is not only suitable for 3D print concrete forming technology but also suitable for the normal concrete forming technology.

Further, the activator agent comprises one or more of sodium hydroxide, potassium hydroxide, sodium carbonate, potassium carbonate, and water glass. A mixture solution in the mixture of the alkali-activated cementing materials and the mixing water is a strong-basic solution. The concentration of $OH^-$ ions is high, which is an excellent conductor to increase a temperature of the mixture and to accelerate the hydration reaction rate of the cementing materials by converting the electric energy to internal energy. Under an external electric field, the $OH^-$ ions are enriched on the condition of the electric field formed at the surface of the solid particles, increasing a local concentration of the reactant and further promoting the hydration reaction. In addition, the hydration process of the alkali-activated cementing material is an exothermic reaction. The faster the hydration rate is, the more heat is released and the higher a temperature of the mixture is provided. Therefore, a hydration environment is formed in the activator mixture of alkali-activated cementing material with a positive feedback between the hydration rate and the temperature. A hydration product is rapidly formed, indicated as the setting and hardening of the mixture. By adding an external electric field, the temperature and electric field gradient are changed in the mixture of the alkali-activated cementing material for controlling the hydration rate and hydration progress, thus controlling the setting time.

Further, the powdery active material containing silicon-aluminum oxides is a kind of powdery material with a pozzolanic activity and a specific surface area larger than 200 $m^2$/kg, obtained through high-temperature treatment or high-temperature processing; main chemical compositions of the powdery active material are silicon-aluminum oxides. The active material comprises one or more of granulated blast furnace slag powder, grinded steel cinder, Bayer process red mud, fly ash, grinded slag, grinded calcined clay minerals, phosphate slag powder, grinded calcined coal gangue and grinded calcined shale.

Further, mass composition of the cementing material is in the range of 60-80 parts of powdery active material containing silicon-aluminum oxides, 2-16 parts of the activator calculated as $Na_2O+0.658\ K_2O$, 0-10 parts of a water reducing agent, 0-10 parts of a retarder, 0-10 parts of a swelling agent and 0-40 parts of an admixture.

In the present technical solution, the external electric field provides an alternating current.

Furthermore, to fulfill the second objective of the present invention, the special equipment of a concrete construction method for controlling setting time in the technical solution comprises a transporting pump, a transporting pipeline, an extrusion device. The extrusion device comprises an electric treatment equipment and an extrusion outlet; the electric treatment equipment is connected with the transporting pipeline; the extrusion outlet is provided behind the electric treatment equipment; at least one set of electrodes in contact with a concrete mixture is provided in the electric treatment equipment and a voltage difference is formed between electrodes after being electrified. The transporting pump is a power equipment for pressurizing, transporting and extruding the concrete mixture; the transporting pipeline is a pipeline connected between the transporting pump and the electrical treatment device and configured to bear pressure. The electrical treatment device is a device providing an external electric field to the concrete mixture and creating a current; and the extrusion outlet is an opening for extruding an electrically-treated mixture. The extrusion outlet can be a short pipe with an opening provided separately after the electrical treatment equipment and also can be a pipe opening directly provided at the rear end of the electrical treatment equipment. The extrusion outlet just works for extruding the mixture after the electric treatment equipment.

In the special equipment of a concrete construction method for controlling setting time, at least one set of electrodes are provided in contact with the concrete mixture in the electric treatment equipment. An electric field is formed between the electrodes after being electrified, and an alternating current is formed on the mixtures in the equipment. The external electric field accelerates the hydration rate of the cementing material and controls the setting time, thus ensuring realization of the construction method which can control the setting time.

Further, an insulating pipeline is provided on an external wall of the electric treatment device and the matched electrodes are provided inside the insulating pipeline. In this case, the electrodes and the concrete are in contact with each other. The insulating pipeline on the external wall of the electric treatment equipment ensures no power off and no short circuit during the formation of the electric field. The electrodes are placed in the internal part of the pipeline corresponding with the pipeline. Contact between the electrodes and the concrete ensures that when the electrodes are energized, a current between the mixture will be created.

Still further, a set of electrodes provided in the electric treatment equipment consists of two uniformly distributed electrodes or three uniformly distributed electrodes, creating a current passing through the mixture between the electrodes. Due to the uniformly distributed electrodes and the current created passing through the mixture, a stable hydration rate of the cementing materials which pass through the electric treatment equipment, is provided to ensure the stable realization of the construction method.

DETAILED DESCRIPTION

An embodiment is provide for further describing the technical solution of the present invention. However, the protection scope of the present invention is not limited to this.

Figure 1:
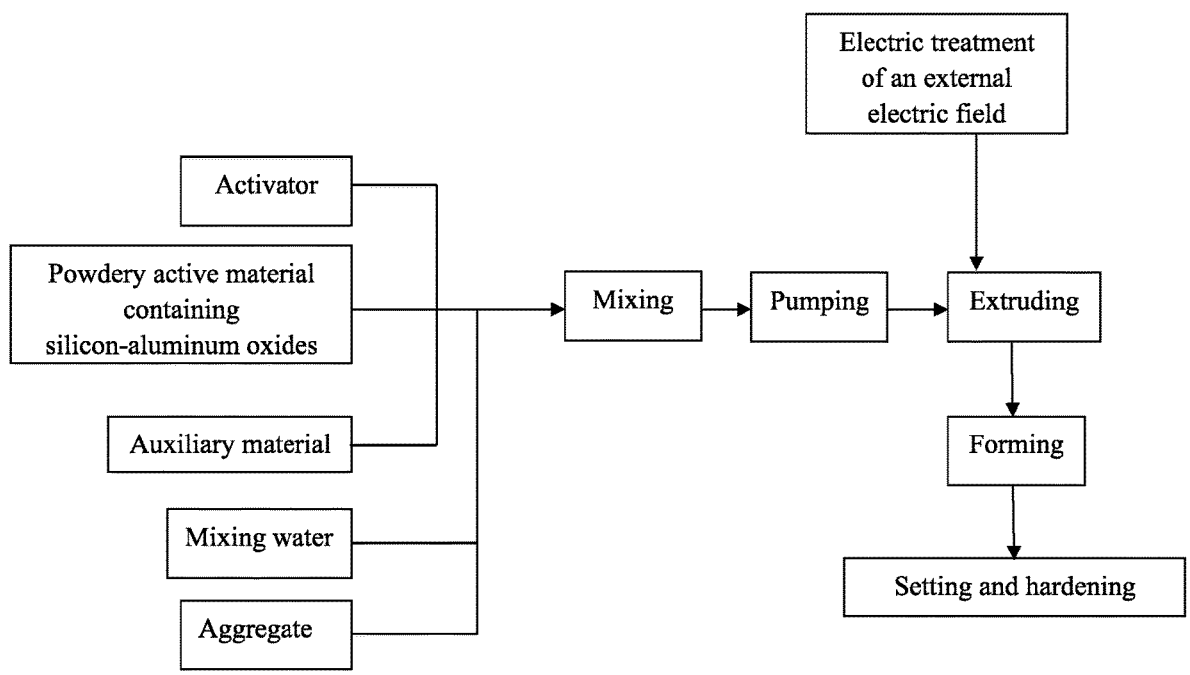
FIG. 1 shows a flow diagram of a concrete construction method for controlling setting time.
Figure 2:
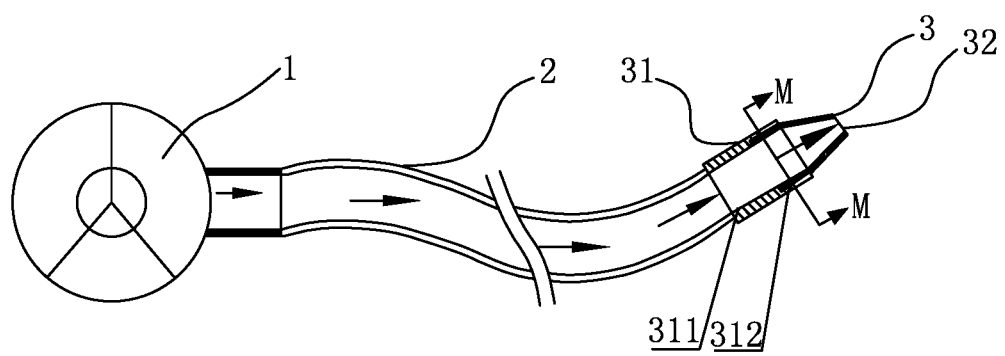
FIG. 2 shows a composition diagram of a special equipment of a construction method for controlling setting time, wherein the direction of arrow indicates a flow direction of the mixture.

As shown in FIG. 1, the concrete construction method for controlling setting time, comprises the following processes:

a. mixing: evenly mixing a concrete raw material with mixing water and aggregate to form a concrete mixture; the concrete raw material at least comprises an activator and a cementing material comprising a powdery active material containing silicon-aluminum oxides;

b. pumping: pumping the concrete mixture to an extrusion device through a transporting pipeline;

c. extruding: extruding the concrete mixture through an extrusion outlet;

d. forming: forming a construction component with a required size and shape; and e. setting and hardening: setting and hardening the construction component;

Between the step b pumping and the step c extruding, an electric treatment step of applying an external electric field to the concrete mixture is further included; the concrete mixture applied with the external electric field is immediately extruded through the extrusion outlet.

Usually in the electric process with the external electric field, when the external electric field is an alternating current with 380V per meter, the mixture will coagulate and harden in 8 minutes; when the applied electric field is an alternating current with 110V per meter, the mixture will coagulate and harden in 11 minutes. The hydration rate of the cementing materials is significantly accelerated, and the setting time is well controlled. The mixture is immediately extruded after the electric process through the extrusion outlet (extrusion must be before the setting and the hardening processes in accordance with the requirements). The concrete raw materials comprise the cementing materials. the quality composition of the cementing materials comprises: 78 parts of the powdery active material containing silicon-aluminum oxides, 4 parts of the activator calculated as $Na_2O+0.658 K_2O$ mixture, 1 part of water-reducing agent, 1.5 parts of the retarder, 1 part of the swelling agent and 1.2 parts of the admixture. The powdery active material containing silicon-aluminum oxides is a kind of powdery material with a pozzolanic activity and a specific surface area larger than 200 $m^2$/kg, obtained through high-temperature treatment or high-temperature processing; main chemical compositions of the powdery active material are silicon-aluminum oxides. The active material at least comprises homogenously-mixed one or more of granulated blast furnace slag powder, grinded steel cinder, fly ash and grinded calcined shale.

The specific and common composition of the cementing material comprising the activator as well as the powdery active material containing silicon-aluminum oxides, is listed below in the table.

TABLE 1

|  | Common composition 1 | Common composition 2 | Common composition 3 | Common composition 4 | Common composition 5 | Common composition 6 |
|---|---|---|---|---|---|---|
| Composition of the cementing materials | Sodium hydroxide | Sodium carbonate | Potassium hydroxide | Sodium hydroxide | Sodium hydroxide | Potassium carbonate |
|  | Granulated blast furnace slag powder | Water glass | Sodium carbonate | Sodium carbonate | Water glass | Sodium hydroxide |
|  | Grinded calcined shale | Fly ash | Granulated blast furnace slag powder | Granulated blast furnace slag powder | Grinded slag | grinded calcined coal gangue |
|  | Water reducing agent | Bayer process red mud | Fly ash | Grinded steel cinder | Grinded calcined clay minerals | Grinded calcined clay minerals |
|  | Swelling agent | Retarder | Admixture | Swelling agent | Phosphate slag powder, | Grinded calcined shale |

The specific mass composition of the cementing materials can be in a range of:

1. 78 parts of powdery active material containing silicon-aluminum oxides, 4 parts of the activator calculated as $Na_2O+0.658 K_2O$ mixture, 1 part of a water reducing agent, 1 part of a retarder, 1 part of a swelling agent and 1.2 parts of an admixture. The powdery active material containing silicon-aluminum oxides is a kind of powdery material with a pozzolanic activity and a specific surface area larger than 200 $m^2$/kg, obtained through high-temperature treatment or high-temperature processing; main chemical compositions of the powdery active material are silicon-aluminum oxides. The active material comprises homogenously-mixed one or more of granulated blast furnace slag powder, grinded steel cinder, fly ash, and grinded calcined shale;

2. 60 parts of powdery active material containing silicon-aluminum oxides, 3 parts of the activator calculated as $Na_2O+0.658 K_2O$ mixture, 2 part of a water reducing agent, 3 part of a retarder. The powdery active material containing silicon-aluminum oxides is a kind of powdery material with a pozzolanic activity and a specific surface area larger than 200 $m^2$/kg, obtained through high-temperature treatment or high-temperature processing; main chemical compositions of the powdery active material are silicon-aluminum oxides.

The active material comprises homogenously-mixed one or more of grinded steel cinder, fly ash, and grinded calcined shale;

3. 76 parts of powdery active material containing silicon-aluminum oxides, 4 parts of the activator calculated as $Na_2O+0.658\ K_2O$ mixture, 1 part of a water reducing agent, 1.5 part of a retarder, 2 part of a swelling agent and 1.2 parts of an admixture. The powdery active material containing silicon-aluminum oxides is a kind of powdery material with a pozzolanic activity and a specific surface area larger than 200 $m^2$/kg, obtained through high-temperature treatment or high-temperature processing; main chemical compositions of the powdery active material are silicon-aluminum oxides. The active material comprises homogenously-mixed one or more of granulated blast furnace slag powder, grinded steel cinder, fly ash, and grinded calcined shale;

4. 80 parts of powdery active material containing silicon-aluminum oxides, 5 parts of the activator calculated as $Na_2O+0.658\ K_2O$ mixture, 3 part of a water reducing agent, 2 part of a retarder, 1 part of a swelling agent and 15 parts of an admixture. The powdery active material containing silicon-aluminum oxides is a kind of powdery material with a pozzolanic activity and a specific surface area larger than 200 $m^2$/kg, obtained through high-temperature treatment or high-temperature processing; main chemical compositions of the powdery active material are silicon-aluminum oxides. The active material comprises homogenously-mixed one or more of granulated blast furnace slag powder, grinded steel cinder, and fly ash;

5. 75 parts of powdery active material containing silicon-aluminum oxides, 6 parts of the activator calculated as $Na_2O+0.658\ K_2O$ mixture, 5 part of a swelling agent and 10 parts of an admixture. The powdery active material containing silicon-aluminum oxides is a kind of powdery material with a pozzolanic activity and a specific surface area larger than 200 $m^2$/kg, obtained through high-temperature treatment or high-temperature processing; main chemical compositions of the powdery active material are silicon-aluminum oxides. The active material comprises homogenously-mixed one or more of granulated blast furnace slag powder, grinded steel cinder, and grinded calcined shale.

Figure 3:
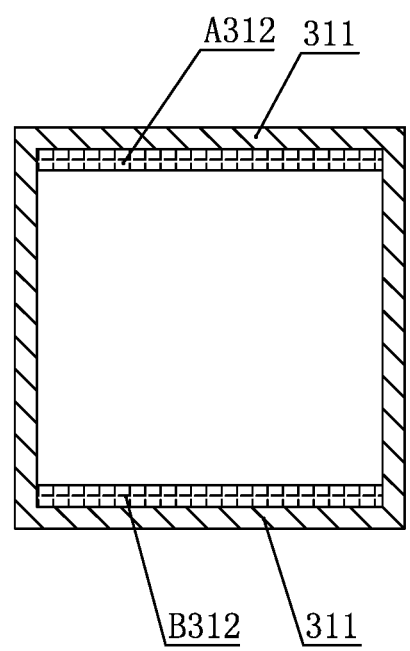
FIG. 3 shows a cross section view of M-M in FIG. 2 when a set of electrodes consists of two electrodes: electrode A and electrode B.
Figure 4:
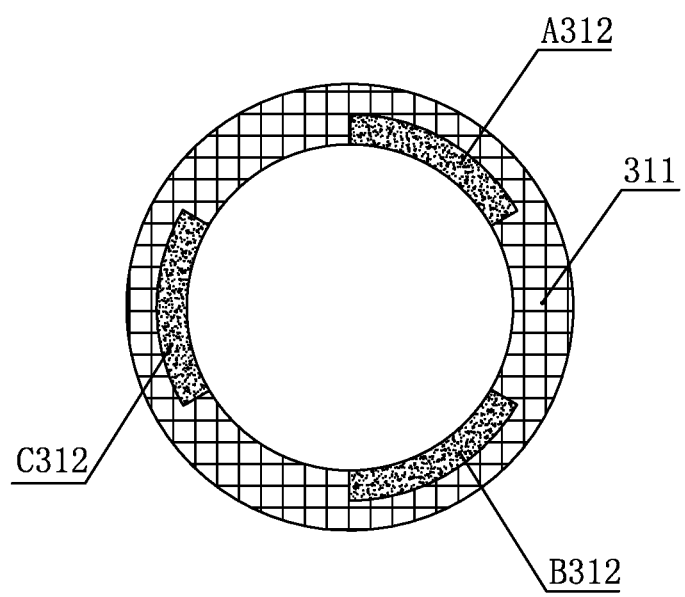
FIG. 4 shows a cross section view of M-M in FIG. 2 when a set of electrodes consists of three electrodes: electrode A, electrode B and electrode C.
Figure 5:
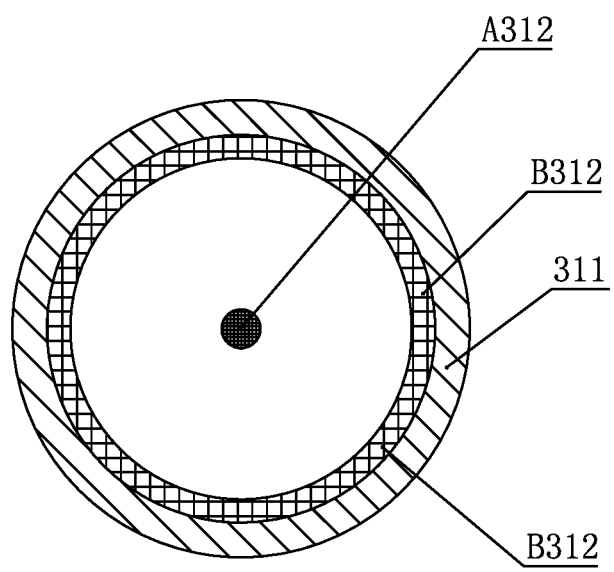
FIG. 5 shows a cross section view of M-M in FIG. 2 when in another condition, a set of electrodes consists of two electrodes: electrode A and electrode B.

As shown in FIG. 2, FIG. 3, FIG. 4 and FIG. 5, the special equipment of a concrete construction method for controlling setting time in the technical solution comprises a transporting pump 1, a transporting pipeline 2 and an extrusion device 3. The extrusion device comprises an electric treatment equipment 31 and an extrusion outlet 32. The electric treatment equipment 31 is connected with the transporting pipeline 2 and extrusion outlet 32 is provided behind the electric treatment equipment. The electric treatment equipment 31 comprises the insulating pipeline 311 and the corresponding electrodes 312. The electrodes 312 are in contact with the concrete mixture and a voltage difference is provided between electrodes after being electrified. The transporting pump is a power equipment for pressurizing, transporting and extruding the concrete mixture; the transporting pipeline is a pipeline connected between the transporting pump and the electrical treatment device and configured to bear pressure; the electrical treatment device is a device providing an external electric field to the concrete mixture and creating a current; and the extrusion outlet is an opening for extruding an electrically-treated mixture. The electrodes can consist of electrode A 312 and electrode B 312 as shown in FIG. 3, wherein the created electric field intersects with a direction of the mixture flowing; or can consist of electrode A 312, electrode B 312 and electrode C 312 as shown in FIG. 4, wherein the created electric field intersects with a direction of the mixture flowing and 3 phase power supply is provided; or can consist of electrode A 312 and electrode B 312 as shown in FIG. 5, wherein electrode A 312 is an central electrode and electrode B 312 is an circumferential electrode surrounding the central electrode and the created electric field intersects with a direction of the mixture flowing.

The foregoing description of specific embodiments of the present invention is provided for the purpose of understanding the method and core idea of the invention. It should be noted that it will be apparent to those skilled in the art that various modifications and adaptations can be made based on the present invention without departing from the principles and spirits of the invention, which are also within the scope of the claims of the present invention.

What is claimed is:

1. A concrete construction equipment for controlling setting time, comprising:
a transporting pump, a transporting pipeline and an extrusion device;
wherein the extrusion device comprises an electric treatment equipment and an extrusion outlet; the electric treatment equipment is connected with the transporting pipeline; the extrusion outlet is provided behind the electric treatment equipment;
wherein the electric treatment equipment comprises an insulating pipeline and at least one set of electrodes in contact with a concrete mixture; and an electric field is formed between electrodes after being electrified;
the concrete mixture comprises an activator agent; the activator agent comprises one or more of sodium hydroxide, potassium hydroxide, sodium carbonate, potassium carbonate, and water glass;
wherein the at least one set of the electrodes in the electric treatment equipment comprises a central electrode arranged in a centre of the electric treatment equipment and a circular electrode arranged on an inner wall of the insulating pipeline; the circular electrode covers the whole inner wall of the insulating pipeline in a circumferential direction of the insulating pipeline; formed electric field intersects with a flowing direction of the mixture;
the transporting pump is a power equipment for pressurizing, transporting and extruding the concrete mixture; the transporting pipeline is a pipeline connected between the transporting pump and the electrical treatment device and configured to bear pressure; the electrical treatment device is a device providing an external electric field to the concrete mixture and creating a current; and the extrusion outlet is an opening for extruding an electrically-treated mixture.

* * * * *